US005620234A

United States Patent [19]
Gunby

[11] Patent Number: 5,620,234
[45] Date of Patent: Apr. 15, 1997

[54] SEAT BELT CUSHION

[76] Inventor: Judy W. Gunby, 8121 Hwy. 54, Sharpsburg, Ga. 30277

[21] Appl. No.: 555,844

[22] Filed: Nov. 13, 1995

[51] Int. Cl.$^6$ ................................................ B60R 22/00
[52] U.S. Cl. ............................... 297/482; 297/DIG. 6
[58] Field of Search ............................... 297/482, DIG. 6

[56] References Cited

U.S. PATENT DOCUMENTS

| D. 302,607 | 8/1989 | Krebs et al. | D29/10 |
|---|---|---|---|
| D. 302,748 | 8/1989 | Dubeck et al. | D29/10 |
| D. 308,287 | 6/1990 | Miller et al. | D2/639 |
| D. 338,552 | 8/1993 | Carrico et al. | D2/639 |
| 3,957,282 | 5/1976 | Finnigan | 297/482 |
| 4,886,318 | 12/1989 | Pennock | 297/482 |
| 4,887,318 | 12/1989 | Weinreb | 297/482 X |
| 4,953,816 | 9/1990 | Wilkinson | 297/482 X |
| 5,322,349 | 6/1994 | Gianino | 297/482 |

FOREIGN PATENT DOCUMENTS

| 2436608 | 5/1980 | France | 297/482 |
|---|---|---|---|
| 74747 | 4/1988 | Japan | 297/482 |

Primary Examiner—Peter R. Brown

[57] ABSTRACT

The present device relates to a seat belt cushion that includes a cushion comprising a foam like interior which is permanently encased by a cushion face. In the preferred embodiment, VELCRO™ fastening elements enable the device to be secured to a seat belt by means a VELCRO™ backing secured to the length of the seat belt. The seat belt cushion, therefore, can be attached anywhere along the length of the seat belt. Once secured, the seat belt cushion may be slid along the length of the seat belt in order to adjust to fit an individual of any height, weight, gender or other physical characteristics. The seat belt cushion is manufactured in a variety of lengths, widths and degrees of thickness to accommodate the demands of the particular user. Moreover, the seat belt user can be utilized in conjunction with the seat belts of automobiles, trucks, buses and airplanes. Protracted sides on either distal end of the cushion prevent the entire seat belt from contacting the user's torso. Further, the face of the cushion padding comprises protruding columns of varying lengths, enabling the seat belt cushion to function as a messaging means.

5 Claims, 1 Drawing Sheet

SEAT BELT CUSHION

BACKGROUND OF THE INVENTION

1. Field of the Invention

The present invention relates to a seat belt cushion. More particularly, the present invention relates to a seat belt cushion specifically adapted for use in conjunction with a conventional seat belt, in order to provide comfort and relief from the irritation and nuisance typically associated with the conventional seat belt.

2. Description of the Prior Art

People rely heavily upon automobiles for everything from business to recreation. It is not uncommon, therefore, for people to spend lengthy periods during the day traveling from one location to another. Because it is necessary to wear a seat belt while in transit, drivers and passengers alike are subject to the discomfort and irritation commonly associated with conventional seat belts. These problems are particularly acute where the journey lasts for extended lengths of time. Moreover, because seat belts tend to affect the individual's collar bone or chest area in particular, women are more likely to experience the above-described difficulties. What is needed, therefore, is a device which can attach to an existing seat belt and provide a buffer between the individual and the seat belt. By offering this buffer, a cushion is provided which alleviates the soreness and discomfort associated with the rigid material used in conventional seat belts. A further advantage of the seat belt cushion is that it can be attached to any location along the surface of the seat belt, in order to accommodate an individual of any size. Moreover, because the preferred attachment means of the device is a Velcro™ adhesive pad, the seat belt would not be prevented from retracting when the same is not in use.

Numerous innovations for a seat belt cushion have been provided in the prior art that are described as follows. Even though these innovations may be suitable for the specific individual purposes to which they address, they differ from the present invention as hereinafter contrasted.

U.S. Pat. Nos. Des. 308,287 to Miller et al., Des. 302,607 to Krebs et al., Des. 338,552 to Carrico et al., and Des. 302,748 to Dubeck et al. reveal ornamental designs for seat belt pads. These patents differ from the present invention because an adjustable seat belt pad, providing a foam cushion which functions as a means to alleviate the soreness and discomfort associated with using a conventional seat belt, is not disclosed. Moreover, an attachment means comprised of hook and loop fastening elements or VELCRO adhesive backing, is not disclosed.

U.S. Pat. No. 5,322,349 to Gianino discloses a seat belt cushion apparatus comprised of removable padding. The patent wraps around the face of the seat belt, and is intended to buffer that portion of the seat belt which covers the individual's torso. This patent differs from the present invention because the present invention comprises either hook and loop fastening elements or VELCRO adhesive backing whereas the present patent utilizes an attachment means having a rigidly attached flap. Moreover, by utilizing the above attachment means the present invention does not prevent the seat belt from retracting, whereas the present patent prevents the seat belt from retracting beyond a point where the same attaches to the seat belt.

Numerous innovations for the seat belt cushion have been provided in the prior art that are adapted to be used. Even though these innovations may be suitable for the specific individual purposes to which they address, they would not be suitable for the purposes of the present invention as heretofore described.

SUMMARY OF THE INVENTION

In accordance with the present invention, a seat belt cushion includes a rigid, rectangular-shaped backing having a cushion permanently attached thereto. In its preferred embodiment, the seat belt cushion comprises hook and loop fastening elements which allow the device to be removably attached to a VELCRO™ backing that extends the length of the face of the seat belt.

Accordingly, it is an object of the present invention to provide a seat belt cushion.

More particularly, it is an object of the present invention to provide a seat belt cushion which attaches to an existing seat belt and does not interfere with the function of the same.

In keeping with these objects, and with others which will become apparent hereinafter, one feature of the present invention resides, briefly stated, in that the seat belt cushion can be adjusted along the length of the seat belt, in order to accommodate an occupant of any height, weight, gender or other physical characteristics.

When the seat belt cushion is designed in accordance with the present invention, the device provides relief from the irritation and discomfort typically associated with the traditional seat belt.

Another feature of the present invention is its versatile construction, enabling the seat belt cushion to be manufactured in a variety of sizes to enable the same to be used with the seat belts of automobiles, trucks, buses, trains and airplanes.

Another feature of the present invention is that it is simple to use, requiring the user to merely fasten the seat belt cushion to an existing seat belt.

Still another feature of the present invention is that it may be manufactured from a number of different materials including, but not limited to: nylon, cotton, leather, rubber, rubber composite, cloth, LYCRA™, SPANDEX™, polyester and wool.

Yet still another feature of the present invention is that it may be comprised of hook and loop fastening elements.

Still yet another feature of the present invention is the simplicity of design, which would facilitate the manufacture and production of the seat belt cushion.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

BRIEF LIST OF REFERENCE NUMERALS UTILIZED IN THE DRAWING

10—seat belt cushion 10
12—hook and loop fastening elements
14—cushion 14
14A—cushion face 14A
14B—cushion back 14B
14C—cushion padding 14C
14CA—cushion padding chutes 14CA
14D—cushion sides 14D 16—seat belt 16
16A—seat belt hook and loop fastening elements 16A

BRIEF DESCRIPTION OF THE PREFERRED EMBODIMENT

DETAILED DESCRIPTION OF THE PREFERRED EMBODIMENT

Figure 1:
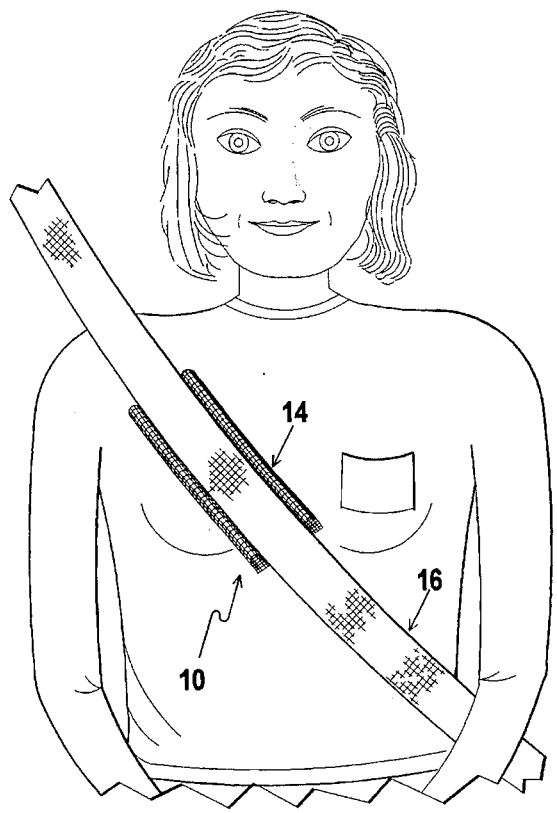
FIG. 1 is a front view of the seat belt cushion attached to a seat belt, the seat belt being secured around the user's shoulder (forward view).

Firstly, referring to FIG. 1 is a front view of the seat belt cushion 10 attached to a seat belt 16, the seat belt 16 being secured around the user's shoulder, exhibiting the following features: hook and loop fastening elements (Exhibited in FIG. 2) 12; cushion 14; cushion face 14A; cushion back 14B; cushion padding 14C; cushion padding chutes 14CA; cushion sides 14D; seat belt 16; and seat belt hook and loop fastening elements 16A. The seat belt cushion 10 is manufactured in a variety of lengths, widths, and degrees of thickness in order to accommodate seat belts of different sizes and seat belts of different types of vehicles including automobiles, trucks, buses and airplanes. Moreover, the various needs of a particular individual are satisfied because of the various lengths, widths and degrees of thickness of the seat belt cushion 10. In its preferred embodiment, the seat belt cushion 10 is comprised of hook and loop fastening elements 12 which enable the same to be attached and removed from the seat belt 16 with ease. A seat belt hook and loop fastening elements 18A is secured to the length of the seat belt 16 and allows the seat belt cushion 10 to be attached along any location of the seat belt 16. The versatility of the hook and loop fastening elements 12 of any height, weight, or other physical characteristics to employ the seat belt cushion 10. Moreover, the ease with which the seat belt cushion 10 can be attached and removed from the seat belt 16 will not impede the ability of the seat belt 16 to be retracted when the same is not in use. Because the seat belt hook and loop fastening elements 16A does not enhance the width of the seat belt 16 to a point where the ability of the seat belt 16 to retract is affected, by removing the seat belt cushion 10 from the seat belt 16, the seat belt 16 will function properly when not in use.

Figure 2:
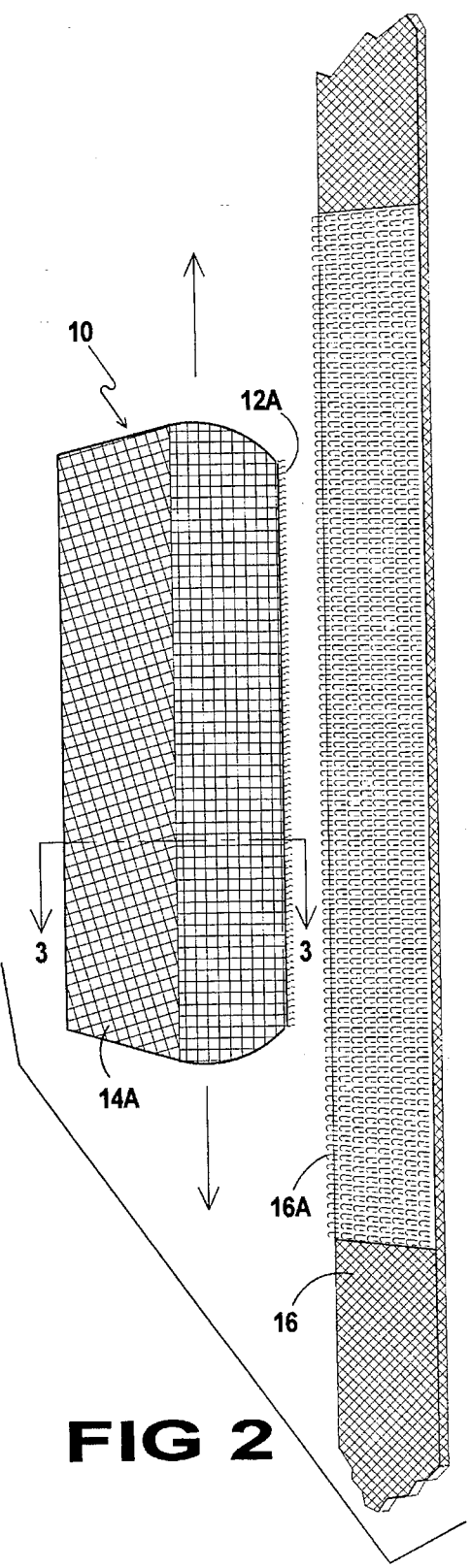
FIG. 2 is a top view of the seat belt cushion exhibiting the hook and loop fastening elements as an attachment means.

Referring to FIG. 2 which is a is a top view of the seat belt cushion 10 exhibiting the hook and loop fastening elements 12 as the attachment means. The hook and loop fastening elements 12 are permanently affixed to the cushion back 14B, and extend the length of the same. The seat belt 16 has seat belt fastening elements 16B permanently affixed to the length of the same. As a result, the user is permitted to attach the seat belt cushion 10 to any location along the length of the seat belt 16. As mentioned hereinbefore, the flexibility of attachment location enables a user of any size or physical characteristic to use the seat belt cushion 10. To attach the seat belt cushion to the seat belt 16, the user need only place the same to that location along the length of the seat belt 16 he or she wishes. The bonding of the two fastening means secures the seat belt cushion 10 to the seat belt 16. To remove the seat belt cushion 10 from the seat belt 16, the user need only pull the same from the seat belt 16.

Figure 3:
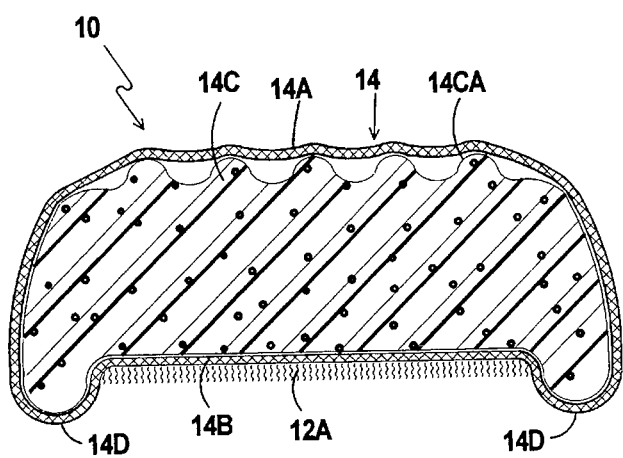
FIG. 3 is a side cross sectional view of the cushion exhibiting the cushion padding.

Referring to FIG. 3 which is a side cross sectional view of the cushion exhibiting the cushion padding. The seat belt cushion 10 may be manufactured in a variety of lengths, widths and degrees of thickness, depending upon the characteristics of the individual 16 and the nature of the vehicle and or seat belt to be used. A cushion face 14A encases the cushion padding 14C, protecting the cushion padding from premature wear and tear. The cushion face 14A further protects the cushion padding from water, sweat, dirt, dust and so forth. The cushion face 14A may be manufactured from a number of different materials including, but not limited to, NYLON™, cotton, VINYL™, leather, SPANDEX™, rubber, cloth, canvas, plastic, plastic composites, polymers, petroleum derivatives, plastic, rubber, and rubber composites. The cushion back 14B covers the rear portion of the seat belt cushion 10 and further covers that portion of the cushion face 14A which extends around the back of the seat belt cushion 10. The cushion padding 14C may be manufactured from a group of materials consisting of open cell foam rubber, closed cell foam rubber, sponge, and cotton. The cushion padding 14C provides a pliant buffer between the seat belt 16 and the user. Because the seat belt 16 is typically manufactured from rigid, unyielding and inflexible material, the user frequently encounters a certain measure of discomfort, irritation and annoyance. The implementation of a cushion 14, located along that length of the seat belt which contacts the user, has a natural consequence of reducing the aggravations normally encountered with a traditional seat belt 16. The cushion padding 14C is rigidly attached to the rear of the cushion face 14A. The opposite end of the cushion padding 14C comprises cushion padding chutes 14CA which extend downwardly from the cushion padding 14C, forming protruding columns of various lengths. The cushion padding chutes 14CA function as a massaging mechanism, created by the protruding columns. The cushion padding chutes are specifically positioned in a manner corresponding to pressure points on a user's torso which are located under the seat belt, the cushion padding chutes therefore function as a messaging means. As such, the user will enjoy the dual benefits of a reduction in irritation and discomfort associated with the conventional seat belt 16, and further will enjoy a degree of massage therapy as a result of the cushion padding chutes 14CA. Moreover, the cushion padding 14C further ensures the seat belt cushion 10 will remain in place while the vehicle is in use, because the uneven surface will reduce the amount of slippage typically associated with the traditional flat surface.

It will be understood that each of the elements described above, or two or more together, may also find a useful application in other types of constructions differing from the type described above.

While the invention has been illustrated and described as embodied in a seat belt cushion, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A seat belt cushion (10) removably attachable to a seat belt (16), slidably repositionable to and from a particular location along the length of the seat belt, the seat belt cushion (10) comprising:

A) a cushion padding (14) which comprises a cushion face and a cushion back having a relatively planar central portion, the cushion face (14C) comprises a plurality of longitudinal cushion padding chutes (14CA) extending therefrom, the cushion padding chutes (14CA) are specifically configured in a longitudinally arranged plurality of columns to prevent the seat belt cushion (10) from slipping, the cushion padding further comprises two cushion sides (14D), each cushion side (14D) is positioned on each opposite longitudinal edge of the cushion back (14B); and a cover member which encloses the cushion padding, said cover having a front surface and a rear surface corresponding to the cushion face and cushion back respectively, and B) a first hook and loop fastening element securely attached to the rear surface of the cover, the first fastening element is complimentary to an elongated second hook and loop fastening element (16A) on the seat belt (16) such that the cushion is adjustably mounted to the seat belt.

2. The seat belt cushion (10) as described in claim 1, wherein the cover (14A) is constructed from a material selected from a group consisting of plastic, plastic composites, polymers, petroleum derivatives, cotton, leather, cloth, plastic, rubber, and rubber composites.

3. The seat belt cushion (10) as described in claim 1, wherein the seat belt cushion (10) is manufactured in a variety of lengths, widths and degrees of thickness.

4. The seat belt cushion (10) as described in claim 1, wherein the cushion padding (14C) is manufactured from a material selected from a group of cushion padding elements consisting of open cell foam rubber, closed cell foam rubber, sponge, and cotton.

5. The seat belt cushion (10) as described in claim 1, wherein the cushion padding chutes (14CA) are specifically positionable along the seat belt for the purpose of corresponding to pressure points on a user's torso which are located under the seat belt (16), whereby the cushion padding chutes (14CA) function as a messaging means.

* * * * *